US008014315B2

(12) United States Patent
Mitchem et al.

(10) Patent No.: US 8,014,315 B2
(45) Date of Patent: Sep. 6, 2011

(54) METHOD FOR SCORING QUEUED FRAMES FOR SELECTIVE TRANSMISSION THROUGH A SWITCH

(75) Inventors: W. Jeffrey Mitchem, Westminster, CO (US); Michael E. O'Donnell, Westminster, CO (US)

(73) Assignee: MCDATA Corporation, San Jose, CA (US)

( * ) Notice: Subject to any disclaimer, the term of this patent is extended or adjusted under 35 U.S.C. 154(b) by 100 days.

(21) Appl. No.: 12/603,414

(22) Filed: Oct. 21, 2009

(65) Prior Publication Data

US 2010/0135312 A1    Jun. 3, 2010

Related U.S. Application Data

(63) Continuation of application No. 12/051,707, filed on Mar. 19, 2008, now Pat. No. 7,848,253, which is a continuation of application No. 10/613,627, filed on Jul. 2, 2003, now Pat. No. 7,382,736, which is a continuation-in-part of application No. 09/728,452, filed on Nov. 30, 2000, now Pat. No. 6,608,819, which is a continuation-in-part of application No. 09/228,678, filed on Jan. 12, 1999, now Pat. No. 6,233,236.

(51) Int. Cl.
*G06F 11/00* (2006.01)
*H04L 12/56* (2006.01)

(52) U.S. Cl. .............. 370/253; 370/232; 370/395.2; 359/352

(58) Field of Classification Search .......... 370/208–468; 359/128, 352; 709/217–240; 711/100–166
See application file for complete search history.

(56) References Cited

U.S. PATENT DOCUMENTS

| 4,683,564 A | 7/1987 | Young et al. |
| 4,791,629 A | 12/1988 | Burns et al. |
| 4,794,629 A | 12/1988 | Pastyr et al. |
| 4,807,280 A | 2/1989 | Posner et al. |

(Continued)

FOREIGN PATENT DOCUMENTS

CA    2273291    11/2000

(Continued)

OTHER PUBLICATIONS

Mindspeed-A Conexant Business, "17×17 3.2 Gbps Crosspoint Switch with Input Equalization-M21110, "Feb. 1, 2001, 2 pages.

(Continued)

*Primary Examiner* — Afsar M. Qureshi
(74) *Attorney, Agent, or Firm* — HKH Law, LLC

(57) ABSTRACT

A method includes determining a priority of each of a plurality of frames, wherein the priority is a function of an initial value dependent on content of each said frame and one or more adjustment values independent of content of each said frame, and selecting the frame with the highest determined priority for transmission through the device prior to transmission of any other of the frames. A system includes a receiving port configured to receive frames and assign an initial priority to each frame, a queue configured to insert queue entries associated with received frames on the queue, each queue entry being inserted at a queue position based on the initial priority assigned to the queue entry, the queue further configured to reorder queue entries based on readjusted priorities of the queue entries; and a transmitter switch configured to transmit the frame having the highest priority before transmitting any other frame.

20 Claims, 4 Drawing Sheets

U.S. PATENT DOCUMENTS

| | | |
|---|---|---|
| 4,876,681 A | 10/1989 | Hagiwara et al. |
| 4,905,230 A | 2/1990 | Madge et al. |
| 4,985,888 A | 1/1991 | Madge et al. |
| 4,985,889 A | 1/1991 | Frankish et al. |
| 5,022,025 A | 6/1991 | Urushidani et al. |
| 5,090,011 A | 2/1992 | Fukuta et al. |
| 5,101,404 A | 3/1992 | Kunimoto et al. |
| 5,195,181 A | 3/1993 | Bryant et al. |
| 5,197,064 A | 3/1993 | Chao |
| 5,224,108 A | 6/1993 | McDysan et al. |
| 5,274,631 A | 12/1993 | Bhardwaj |
| 5,301,192 A | 4/1994 | Henrion |
| 5,305,311 A | 4/1994 | Lyles |
| 5,307,345 A | 4/1994 | Lozowick et al. |
| 5,323,386 A | 6/1994 | Wilner et al. |
| 5,365,512 A | 11/1994 | Combs et al. |
| 5,390,173 A | 2/1995 | Spinney et al. |
| 5,392,279 A | 2/1995 | Taniguchi |
| 5,406,643 A | 4/1995 | Burke et al. |
| 5,408,469 A | 4/1995 | Opher et al. |
| 5,428,616 A * | 6/1995 | Field et al. .................... 370/253 |
| 5,430,442 A | 7/1995 | Kaiser et al. |
| 5,436,893 A | 7/1995 | Barnett |
| 5,459,440 A | 10/1995 | Claridge et al. |
| 5,461,615 A | 10/1995 | Henrion |
| 5,463,620 A | 10/1995 | Sriram |
| 5,506,840 A | 4/1996 | Pauwels et al. |
| 5,515,404 A | 5/1996 | Pearce |
| 5,541,853 A | 7/1996 | Croft |
| 5,546,385 A | 8/1996 | Caspi et al. |
| 5,548,280 A | 8/1996 | Pearce |
| 5,566,170 A | 10/1996 | Bakke et al. |
| 5,598,410 A | 1/1997 | Stone |
| 5,600,795 A | 2/1997 | Du |
| 5,619,497 A | 4/1997 | Gallagher et al. |
| 5,640,504 A | 6/1997 | Johnson et al. |
| 5,654,961 A | 8/1997 | Araujo et al. |
| 5,663,952 A | 9/1997 | Gentry, Jr. |
| 5,663,959 A | 9/1997 | Nakagawa et al. |
| 5,666,353 A | 9/1997 | Klausmeier et al. |
| 5,710,777 A | 1/1998 | Gawne |
| 5,721,819 A | 2/1998 | Galles et al. |
| 5,732,080 A | 3/1998 | Ferguson et al. |
| 5,740,176 A | 4/1998 | Gupta et al. |
| 5,751,710 A | 5/1998 | Crowther et al. |
| 5,754,551 A | 5/1998 | Claridge et al. |
| 5,793,612 A | 8/1998 | Tobin et al. |
| 5,805,598 A | 9/1998 | Loney |
| 5,815,146 A | 9/1998 | Youden et al. |
| 5,825,259 A | 10/1998 | Harpham |
| 5,835,496 A | 11/1998 | Yeung et al. |
| 5,838,684 A | 11/1998 | Wicki et al. |
| 5,862,350 A | 1/1999 | Coulson |
| 5,867,675 A | 2/1999 | Lomelino et al. |
| 5,870,538 A | 2/1999 | Manning et al. |
| 5,872,783 A | 2/1999 | Chin |
| 5,905,712 A | 5/1999 | Cresswell et al. |
| 5,907,566 A | 5/1999 | Benson et al. |
| 5,907,660 A | 5/1999 | Inoue et al. |
| 5,915,094 A | 6/1999 | Kouloheris et al. |
| 5,920,566 A | 7/1999 | Hendel et al. |
| 5,920,886 A | 7/1999 | Feldmeier |
| 5,924,112 A | 7/1999 | Barber et al. |
| 5,926,048 A | 7/1999 | Greatwood |
| 5,936,939 A | 8/1999 | Des Jardins et al. |
| 5,936,966 A | 8/1999 | Ogawa et al. |
| 5,936,967 A | 8/1999 | Baldwin |
| 5,961,597 A | 10/1999 | Sapir et al. |
| 5,978,359 A | 11/1999 | Caldara et al. |
| 5,978,379 A | 11/1999 | Chan et al. |
| 5,991,295 A | 11/1999 | Tout et al. |
| 5,999,528 A | 12/1999 | Chow et al. |
| 6,000,016 A | 12/1999 | Curtis et al. |
| 6,000,020 A | 12/1999 | Chin et al. |
| 6,018,518 A | 1/2000 | Smallwood et al. |
| 6,021,117 A | 2/2000 | Juniper et al. |
| 6,023,471 A | 2/2000 | Haddock et al. |
| 6,035,414 A | 3/2000 | Okazawa et al. |
| 6,038,288 A | 3/2000 | Thomas et al. |
| 6,067,301 A | 5/2000 | Aatresh |
| 6,076,115 A | 6/2000 | Sambamurthy et al. |
| 6,081,522 A | 6/2000 | Hendel et al. |
| 6,088,356 A | 7/2000 | Hendel et al. |
| 6,094,434 A | 7/2000 | Kotzur et al. |
| 6,101,553 A | 8/2000 | Greatwood et al. |
| 6,108,306 A | 8/2000 | Kalkunte et al. |
| 6,118,787 A | 9/2000 | Kalkunte et al. |
| 6,125,417 A | 9/2000 | Bailis et al. |
| 6,128,666 A | 10/2000 | Muller et al. |
| 6,144,668 A | 11/2000 | Bass et al. |
| 6,151,301 A | 11/2000 | Holden |
| 6,151,615 A | 11/2000 | Brooks et al. |
| 6,154,446 A | 11/2000 | Kadambi et al. |
| 6,157,643 A | 12/2000 | Ma |
| 6,160,809 A | 12/2000 | Adiletta et al. |
| 6,172,964 B1 | 1/2001 | Whitton |
| 6,172,990 B1 | 1/2001 | Deb et al. |
| 6,192,054 B1 | 2/2001 | Chan et al. |
| 6,201,816 B1 | 3/2001 | Wilson |
| 6,222,845 B1 | 4/2001 | Shue et al. |
| 6,243,386 B1 | 6/2001 | Chan et al. |
| 6,243,667 B1 | 6/2001 | Kerr et al. |
| 6,272,144 B1 | 8/2001 | Berenbaum et al. |
| 6,275,549 B1 | 8/2001 | Greatwood et al. |
| 6,295,272 B1 | 9/2001 | Feldman et al. |
| 6,320,859 B1 | 11/2001 | Momirov |
| 6,333,929 B1 | 12/2001 | Drottar et al. |
| 6,335,932 B2 | 1/2002 | Kadambi et al. |
| 6,335,935 B2 | 1/2002 | Kadambi et al. |
| 6,343,072 B1 | 1/2002 | Bechtolsheim et al. |
| 6,349,097 B1 | 2/2002 | Smith |
| 6,351,143 B1 | 2/2002 | Guccione et al. |
| 6,351,725 B1 | 2/2002 | Willis et al. |
| 6,356,550 B1 | 3/2002 | Williams |
| 6,356,942 B1 | 3/2002 | Bengtsson et al. |
| 6,369,855 B1 | 4/2002 | Chauvel et al. |
| 6,421,352 B1 | 7/2002 | Manaka et al. |
| 6,424,658 B1 | 7/2002 | Mather |
| 6,424,659 B2 | 7/2002 | Viswanadham et al. |
| 6,427,185 B1 | 7/2002 | Ryals et al. |
| 6,463,063 B1 | 10/2002 | Bianchini, Jr. et al. |
| 6,470,436 B1 | 10/2002 | Croft et al. |
| 6,473,433 B1 | 10/2002 | Bianchini, Jr. et al. |
| 6,477,167 B1 | 11/2002 | Wu |
| 6,477,174 B1 | 11/2002 | Dooley et al. |
| 6,490,280 B1 | 12/2002 | Leung |
| 6,493,347 B2 | 12/2002 | Sindhu et al. |
| 6,522,656 B1 | 2/2003 | Gridley |
| 6,532,234 B1 | 3/2003 | Yoshikawa |
| 6,539,020 B1 | 3/2003 | Barber et al. |
| 6,549,519 B1 | 4/2003 | Michels et al. |
| 6,553,370 B1 | 4/2003 | Andreev et al. |
| 6,567,404 B1 | 5/2003 | Wilford |
| 6,580,721 B1 | 6/2003 | Beshai |
| 6,606,300 B1 | 8/2003 | Blanc et al. |
| 6,611,522 B1 | 8/2003 | Zheng et al. |
| 6,614,796 B1 | 9/2003 | Black et al. |
| 6,643,269 B1 | 11/2003 | Fan et al. |
| 6,654,342 B1 | 11/2003 | Dittia et al. |
| 6,654,370 B1 | 11/2003 | Quirke et al. |
| 6,654,373 B1 | 11/2003 | Maher, III et al. |
| 6,658,002 B1 | 12/2003 | Ross et al. |
| 6,671,275 B1 | 12/2003 | Wong et al. |
| 6,674,754 B1 | 1/2004 | Ofek |
| 6,681,332 B1 | 1/2004 | Byrne et al. |
| 6,687,247 B1 | 2/2004 | Wilford et al. |
| 6,691,202 B2 | 2/2004 | Vasquez et al. |
| 6,696,917 B1 | 2/2004 | Heitner et al. |
| 6,697,359 B1 | 2/2004 | George |
| 6,697,368 B2 | 2/2004 | Chang et al. |
| 6,700,894 B1 | 3/2004 | Shung |
| 6,707,818 B1 | 3/2004 | Kadambi et al. |
| 6,711,357 B1 | 3/2004 | Brewer et al. |
| 6,721,229 B1 | 4/2004 | Cole |
| 6,721,268 B1 | 4/2004 | Ohira et al. |
| 6,721,313 B1 | 4/2004 | Van Duyne |
| 6,735,218 B2 | 5/2004 | Chang et al. |

| | | |
|---|---|---|
| 6,741,597 B1 | 5/2004 | Jeong |
| 6,751,224 B1 | 6/2004 | Parruck et al. |
| 6,754,881 B2 | 6/2004 | Kuhlmann et al. |
| 6,775,706 B1 | 8/2004 | Fukumoto et al. |
| 6,778,546 B1 | 8/2004 | Epps et al. |
| 6,781,990 B1 | 8/2004 | Puri et al. |
| 6,792,484 B1 | 9/2004 | Hook |
| 6,792,502 B1 | 9/2004 | Pandya et al. |
| 6,798,740 B1 | 9/2004 | Senevirathne et al. |
| 6,804,731 B1 | 10/2004 | Chang et al. |
| 6,807,179 B1 | 10/2004 | Kanuri et al. |
| 6,807,363 B1 | 10/2004 | Abiko et al. |
| 6,810,046 B2 | 10/2004 | Abbas et al. |
| 6,813,243 B1 | 11/2004 | Epps et al. |
| 6,816,467 B1 | 11/2004 | Muller et al. |
| 6,822,940 B1 | 11/2004 | Zavalkovsky et al. |
| 6,831,923 B1 | 12/2004 | Laor et al. |
| 6,831,932 B1 | 12/2004 | Boyle et al. |
| 6,839,346 B1 | 1/2005 | Kametani |
| 6,842,422 B1 | 1/2005 | Bianchini, Jr. |
| 6,854,117 B1 | 2/2005 | Roberts |
| 6,879,559 B1 | 4/2005 | Blackmon |
| 6,894,970 B1 | 5/2005 | McDermott, III et al. |
| 6,898,182 B1 | 5/2005 | Cloonan |
| 6,901,072 B1 | 5/2005 | Wong |
| 6,920,154 B1 | 7/2005 | Achler |
| 6,925,516 B2 | 8/2005 | Struhsaker et al. |
| 6,937,606 B2 | 8/2005 | Basso et al. |
| 6,946,948 B2 | 9/2005 | McCormack et al. |
| 6,957,258 B2 | 10/2005 | Maher, III et al. |
| 6,959,007 B1 | 10/2005 | Vogel et al. |
| 6,977,943 B2 | 12/2005 | Zboril |
| 7,009,968 B2 | 3/2006 | Ambe et al. |
| 7,012,919 B1 | 3/2006 | So et al. |
| 7,050,430 B2 | 5/2006 | Kalkunte et al. |
| 7,126,956 B2 | 10/2006 | Scholten |
| 7,133,399 B1 | 11/2006 | Brewer et al. |
| 7,151,797 B2 | 12/2006 | Limberg |
| 7,161,948 B2 | 1/2007 | Sampath et al. |
| 7,167,471 B2 | 1/2007 | Calvignac et al. |
| 7,185,141 B1 | 2/2007 | James et al. |
| 7,185,266 B2 | 2/2007 | Blightman et al. |
| 7,187,687 B1 | 3/2007 | Davis et al. |
| 7,191,277 B2 | 3/2007 | Broyles |
| 7,191,468 B2 | 3/2007 | Hanner |
| 7,203,194 B2 | 4/2007 | Chang et al. |
| 7,206,283 B2 | 4/2007 | Chang et al. |
| 7,212,536 B2 | 5/2007 | MacKiewich |
| 7,224,670 B2 | 5/2007 | Jeffries et al. |
| 7,236,490 B2 | 6/2007 | Chang et al. |
| 7,266,117 B1 | 9/2007 | Davis |
| 7,283,470 B1 | 10/2007 | Sindhu et al. |
| 7,324,500 B1 | 1/2008 | Blackmon |
| 7,356,030 B2 | 4/2008 | Chang et al. |
| 7,382,728 B2 | 6/2008 | Chen et al. |
| 7,382,736 B2 | 6/2008 | Mitchem |
| 7,633,968 B2 * | 12/2009 | Haran et al. ................... 370/468 |
| 7,716,366 B2 * | 5/2010 | Regan et al. ................... 709/240 |
| 2001/0007560 A1 | 7/2001 | Masuda et al. |
| 2001/0048785 A1 | 12/2001 | Steinberg |
| 2001/0053150 A1 | 12/2001 | Clear et al. |
| 2002/0012585 A1 | 1/2002 | Kalkunte et al. |
| 2002/0054594 A1 | 5/2002 | Hoof et al. |
| 2002/0069294 A1 | 6/2002 | Herkersdorf et al. |
| 2002/0073073 A1 | 6/2002 | Cheng |
| 2002/0073167 A1* | 6/2002 | Powell et al. ................... 709/217 |
| 2002/0089977 A1 | 7/2002 | Chang et al. |
| 2002/0091884 A1 | 7/2002 | Chang et al. |
| 2002/0097713 A1 | 7/2002 | Chang et al. |
| 2002/0105966 A1 | 8/2002 | Patel et al. |
| 2002/0126672 A1 | 9/2002 | Chow et al. |
| 2002/0146013 A1 | 10/2002 | Karlsson et al. |
| 2003/0009466 A1 | 1/2003 | Ta et al. |
| 2003/0033435 A1 | 2/2003 | Hanner |
| 2003/0043800 A1 | 3/2003 | Sonksen et al. |
| 2003/0048785 A1 | 3/2003 | Calvignac et al. |
| 2003/0103499 A1 | 6/2003 | Davis et al. |
| 2003/0110180 A1 | 6/2003 | Calvignac et al. |
| 2003/0152084 A1 | 8/2003 | Lee et al. |
| 2003/0165160 A1 | 9/2003 | Minami et al. |
| 2003/0174719 A1 | 9/2003 | Sampath et al. |
| 2003/0177221 A1 | 9/2003 | Ould-Brahim et al. |
| 2003/0215029 A1 | 11/2003 | Limberg |
| 2004/0022263 A1 | 2/2004 | Zhao et al. |
| 2004/0062246 A1 | 4/2004 | Boucher et al. |
| 2004/0128434 A1 | 7/2004 | Khanna et al. |
| 2004/0179548 A1 | 9/2004 | Chang et al. |
| 2004/0215821 A1* | 10/2004 | Regan et al. ................... 709/240 |
| 2005/0041684 A1 | 2/2005 | Reynolds et al. |
| 2005/0089049 A1 | 4/2005 | Chang et al. |
| 2005/0132132 A1 | 6/2005 | Rosenbluth et al. |
| 2005/0175018 A1 | 8/2005 | Wong |
| 2006/0114876 A1 | 6/2006 | Kalkunte |
| 2007/0179909 A1 | 8/2007 | Channasagara |
| 2007/0208876 A1 | 9/2007 | Davis |
| 2007/0253420 A1 | 11/2007 | Chang |
| 2007/0258475 A1 | 11/2007 | Chinn et al. |
| 2007/0288690 A1 | 12/2007 | Wang et al. |
| 2008/0002707 A1 | 1/2008 | Davis |
| 2008/0049742 A1 | 2/2008 | Bansal |

FOREIGN PATENT DOCUMENTS

| | | |
|---|---|---|
| EP | 0987861 | 3/2000 |
| JP | 2003289359 | 10/2003 |
| KR | WO 0184728 A1 | 11/2001 |

OTHER PUBLICATIONS

The Tolly Group, "Foundry Networks, Inc.—BigIron 4000, Layer 2 & Layer 3 Interoperability Evaluation," No. 199133, Oct. 1999, 4 pages.

The Tolly Group, "Foundry Networks, Inc.—BigIron 8000 Gigabit Ethernet Switching Router, Layer 2 & Layer 3 Performance Evaluation," No. 199111, My 1999, 4 pages.

Satran et al., "Out of Order Incremental CRC Computation," IEEE Transactions on Computers, 54(9): 1178-1181, Sep. 2005.

Spurgeon, C. "Ethernet, The Definitive Guide," O'Reilly & Associates, Inc., Sebastapol, CA Feb. 2000.

ANSI/IEEE Standard 802.1D, 1998 Edition, 373 pages.

Sally Floyd and Van Jacobson, "Random Early Detection Gateways for Congestion Avoidance," Aug. 1993, IEEE/ACM Transactions on Networking, Abstract.

File History for U.S. Appl. No. 09/597,878 (USPN 6,678,248)—Haddock et al.

Foundry Networks, "BigIron Architecture Technical Brief," May 1999—Version 2.01, 15 pages.

Foundry Networks, "BigIron Architecture Technical Brief," Jul. 2001—Version 2.02, 16 pages.

Foundry Networks, "Foundry Networks, Next Generation Terabit System Architecture—The High Performance Revolution for 10 Gigabit Networks," Nov. 17, 2003.

Gigabit Ethernet Alliance—"Accelerating the Standard for Speed," Copyright 1998, 10 pages.

Kichorowsky et al., "Mindspeed.TM.Switch Fabric Offers the Most Comprehensive Solution for Multi-Protocol Networking Equipment," Apr. 30, 2001, 3 pages.

Matsumoto et al., "Switch Fabrics Touted at Interconnects Conference," Aug. 21, 2000, URL= http://www.eetimes.com/story/OEG2000821S0011, accessed Aug. 12, 2002, 2 pages.

McAuley et al., "Fast Routing Table Lookup Using CAMs," Proceedings of INFOCOM, Mar.-Apr. 1993, pp. 1382-1391.

Foundry Networks, "JetCore TM Based Chassis Systems—An Architecture Brief on Netiron, BigIron, and FastIron Systems," Jan. 17, 2003.

Mier Communications, Inc., "Lab Testing Summary Report—Product Category: Layer-3 Switches, Vendor Tested: Product Tested: Foundry Networks, BigIron 4000," Report No. 231198, Oct. 1998, 6 pages.

Mier Communications, Inc., "Lab Testing Summary Report—Product Category: Gigabit Backbone Switches, Vendor Tested: Foundry Networks, Product Tested: BigIron 4000," Report No. 210998, Sep. 1998, 6 pages.

Mindspeed—A Conexant Business, "Switch Fabric Chipset-CX27300 iScale.TM." Apr. 30, 2001, 2 pages.

Schroeder, Michael D. et al., "Autonet: a High-speed Self-configuring Local Area Network Using Point-to-point Links," published Apr. 21, 1990.
IN-VSN Enterprise Manager Software Installation and Operation Guide (3016837-SIG REV B, 2005), CNT.
IN-VSN Enterprise Manager Software Installation and Operation Manual (9110509-203-03, May 2001), InRange Technologies.
IN-VSN FC/9000 Fibre Channel Director Installation Manual (9110461-102-02, Dec. 2000), InRange Technologies.
IN-VSN FC/9000 Fibre Channel Director Site Planning Guide for T-Port Configurations (9110460-101-05, Oct. 2001), InRange Technologies.
IN-VSN FC/9000 Fibre Channel Director Site Planning Guide for T-Port Configurations (9114472-101-00), Nov. 2001), InRange Technologies.
Deodhar et al., "Distributed Analyzer Architecture Permits Real-Time Monitoring of Heterogenous Local Area Networks," IEEE, 1989.
White et al., "Getting Started with the INRANGE FC/9000 FICON Director," IBM.com/redbooks, Mar. 2003.
inVSN Enterprise Manager Software Installation and Operation Guide, Revision B, Jun. 8, 2005, McDATA Corporation.
Stallings, William, "SNMP and SNMPv2: The Infrastructure for Network Management," IEEE Communications Magazine, Mar. 1998.
inVSN Enterprise Manager Software Installation and Operation Guide, McDATA Corporation, Broomfield, Colorado, Oct. 2005 (3016837-SIG REV B).
GigWorks MKII-8 Switch, Model MKII-BASE8, Installer's/Users Manual, Publication No. 59004-01 Rev. A, Dec. 1998.
GigWorks MKII and SANbox Switch Families Reference Manual, Publication No. 59001-00 Rev. Prelim. R3, Mar. 1999.
GigWorks MKII-16 Switch, Model MKII-BASE16, Installer's/User's Manual, Publication No. 59003-01 Rev. A, Dec. 1998.
GigWorks MKII BASE-8 and BASE-16 Switch Multistage, Installer's/User's Manual, Publication No. 59007-01 Rev. A, Feb. 1999.
SANbox-8 Fibre Channel Switch, Installer's/User's Manual, Publication No. 59008-02 Rev. A, Mar. 2000.
SANbox-16HA High Availability Fibre Channel Switch, Installer's/User's Manual, Publication No. 59005-02 Rev. A, Mar. 2000.
SANbox-16 STD Fibre Channel Switch, Installer's/User's Manual, Publication No. 59012-02 Rev. A, Mar. 2000.
Switch Management, Installer's/User's Manual, Publication No. 59010-03 Rev. A, Mar. 2000.
Web-Based Switch Management Application, Installer's/User's Manual, Publication No. 59010-01 Rev. A, Jun. 1999.
SNMP Management, Lab III, Ancor Communications, Inc., Jul. 12, 2000.
O Lari, Inrange, CSM Workstation Installation Guide for Windows NT—Draft—Document No. 550-52-07, Part No. 9109676-001-02, Feb. 9, 2000.
INRANGE FC/9000 Environment Guide, Mar. 2001.
IN-VSN FC/9000, Fibre Channel Director, Site Planning Guide for E-Port Configurations, Document Control Number: 9115054-101-00, Mar. 2002.
IN-VSN FC/9000 Fibre Channel Director, Site Planning Guide for T-Port Configurations, Document Control No. 9115055-101-00, Mar. 2002.
SANbox-64, Fibre Channel Switch, (Preliminary) Installer's/User's Manual, Publication No. 59014-00 Rev. R1, May 2000.
INRANGE IN-VSN Enterprise Manager (Advance) Software Installation and Operation Manual, Document Control No. 9110509-203-P3, Jul. 20, 2000.
INRANGE PC/9000-64 Fibre Channel Switch, Installation Manual, Document Control No. 9110461-102-01, Jun. 2000.
INRANGE IN-VSN FC/9000 Fibre Channel Director, Maintenance Manual, Document Control No. 9110774-307-01, Dec. 2000.
INRANGE IN-VSN FC/9000 Fibre Channel Director, Maintenance Manual, Document Control No. 9110774-307-02, Jan. 2002.
INRANGE IN-VSN FC/9000 Fibre Channel Director, Site Planning Guide, Document Control No. 9110460-101-03, Dec. 2000.
INRANGE FC/9000-8FL Fibre Channel Switch, Installation and User Manual, Document Control No. 9110391-103-01, 2000.
INRANGE FC/9000-16FL Fibre Channel Switch, Installation and User Manual, Document Control No. 9110318-103-01, 2000.
INRANGE IN-VSN Enterprise Manager Software, Installation and Operation Manual, Document Control No. 9110509-203-01, Dec. 2000.
INRANGE FC/9000 FC-NMS Software (FL and Non-FL Switches), Installation and Operation Manual, Document Control No. 9110319-103-01, 2000.
FC/9000 64-Port to 128-Port Upgrade—Appendix E, 2000.
European Partial Search Report Issued for EP 01 31 0554, dated Nov. 10, 2004.
Braden et al.; Recommendations on Queue Management and Congestion Avoidance in the Internet; Network Working Group; Apr. 1996.
Stallings, William; High-Speed Networks TCP/IP and ATM Design Principles; Prentice-Hall, Inc. Upper Saddle River, New Jersey; pp. 147-179.
U.S. Appl. No. 09/703,056, filed Oct. 31, 2000, Tony M. Brewer et al.
U.S. Appl. No. 09/703,038, filed Oct. 31, 2000, Tony M. Brewer et al.
Belhadj et al.; "Feasibility of a 100GE MAC," IEEE Meeting Nov. 2006, 18 pages.
Braun et al., "Fast Incremental CRC updates for IP over ATM networks, " IEEE Workshop on High Performance Switching and Routing, 2001, pp. 48-52.
International Search Report dated Jun. 17, 2003 for application No. PCT/US03/08719.
10 Gigabit Ethernet—Technology Overview White Paper, Sep. 2001, 16 pages.
10 Gigabit Ethernet Alliance, Interconnection with Wide Area Networks, Version 1.0, Mar. 2002, 5 pages.
Degermark, M. et al, "Small Forwarding Tables for Fast Routing Lookups," ACM Computer Communications Review, 27(4); Oct. 3-14, 1997.
Foundry Networks, "BigIron Architecture Technical Brief," Oct. 1998—Version 1.0, 15 pages.
Foundry Networks, "BigIron Architecture Technical Brief," Oct. 1998—Version 1.02, 15 pages.
Foundry Networks, "BigIron Architecture Technical Brief," Dec. 1998—Version 1.03, 14 pages.
Foundry Networks, "BigIron Architecture Technical Brief," May 1999—Version 2.0, 15 pages.

* cited by examiner

METHOD FOR SCORING QUEUED FRAMES FOR SELECTIVE TRANSMISSION THROUGH A SWITCH

RELATED APPLICATIONS

This application is a continuation of co-pending U.S. patent application Ser. No. 12/051,707 filed Mar. 19, 2008, which is a continuation of U.S. patent application Ser. No. 10/613,627 filed Jul. 2, 2003 (now U.S. Pat. No. 7,382,736), which is a continuation-in-part of U.S. patent application Ser. No. 09/728,452 filed Nov. 30, 2000 (now U.S. Pat. No. 6,608,819), which is a continuation-in-part of U.S. patent application Ser. No. 09/228,678 filed Jan. 12, 1999 (now U.S. Pat. No. 6,233,236), all of which are incorporated herein by reference.

BACKGROUND

1. Technical Field

Embodiments of the invention pertain generally to improvements in methods for sequencing data through a routing device. More particularly, embodiments pertain to a method for scoring queued frames for selective transmission through a switch. Embodiments are particularly, but not exclusively, useful for selectively transmitting frames through a fibre channel switch.

2. Relevant Background

Computer performance during the past decade has increased significantly, if not exponentially, in part driven by the information explosion. Consequently, demand for high-performance communications for server-to-storage and server-to-server networking also has increased. Performance improvements in hardware entities, including storage, processors, and workstations, along with the move to distributed architectures such as client/server, have increased the demand for data-intensive and high-speed networking applications. The interconnections between and among these systems, and their input/output devices, require enhanced levels of performance in reliability, speed, and distance.

Simultaneously, demands for more robust, highly available, disaster-tolerant computing resources, with ever-increasing speed and memory capabilities, continues unabated. To satisfy such demands, the computer industry has worked to overcome performance problems often attributable to conventional I/O ("input/output devices") subsystems. Mainframes, supercomputers, mass storage systems, workstations and very high-resolution display subsystems frequently are connected to facilitate file and print sharing. Because of the demand for increased speed across such systems, networks and channels conventionally used for connections introduce communication clogging, especially if data is in large file format typical of graphically based applications.

Efforts to satisfy enhanced performance demands have been directed to providing storage interconnect solutions that address performance and reliability requirements of modern storage systems. At least three technologies are directed to solving those problems SCSI ("Small Computer Systems Interface"); SSA ("Serial Storage Architecture"), a technology advanced primarily by IBM; and Fibre Channel, a high performance interconnect technology.

Two prevalent types; of data communication connections exist between processors, and between a processor and peripherals. A "channel" provides direct or switched point-to-point connection communicating devices. The channel's primary task is to transport data at the highest possible data rate with the least amount of delay. Channels typically perform simple error correction in hardware. A "network", by contrast, is an aggregation of distributed nodes. A "node" as used in this document is either an individual computer or similar machine in a network (workstations, mass storage units, etc.) with a protocol that supports interaction among the nodes. Typically, each node must be capable of recognizing error conditions on the network and must provide the error management required to recover from the error conditions.

SCSI is an "intelligent" and parallel I/O bus on which various peripheral devices and controllers can exchange information. Although designed approximately 15 years ago, SCSI remains in use. The first SCSI standard, now known as SCSI-1, was adopted in 1986 and originally designed to accommodate up to eight devices at speeds of 5 MB/sec. SCSI standards and technology have been refined and extended frequently, providing ever faster data transfer rates up to 40 MB/sec. SCSI performance has doubled approximately every five years since the original standard was released, and the number of devices permitted on a single bus has been increased to 16. In addition, backward compatibility has been enhanced, enabling newer devices to coexist on a bus with older devices. However, significant problems associated with SCSI remain, including, for example, limitations caused by bus speed, bus length, reliability, cost, and device count. In connection with bus length, originally limited to six meters, newer standards requiring even faster transfer rates and higher device populations now place more stringent limitations on bus length that are only partially cured by expensive differential cabling or extenders.

Accordingly, industry designers now seek to solve the limitations inherent in SCSI by employing serial device interfaces. Featuring data transfer rates as high as 200 MB/sec, serial interfaces use point-to-point interconnections rather than busses. Serial designs also decrease cable complexity, simplify electrical requirements, and increase reliability. Two solutions have been considered, Serial Storage Architecture and what has become known as Fibre Channel technology, including the Fibre Channel Arbitrated Loop ("FC-AL").

Serial Storage Architecture is a high-speed serial interface designed to connect data storage devices, subsystem, servers and workstations. SSA was developed and is promoted as an industry standard by IBM; formal standardization processes began in 1992. Currently, SSA is undergoing approval processes as an ANSI standard. Although the basic transfer rate through an SSA port is only 20 MB/sec, SSA is dual ported and full-duplex, resulting in a maximum aggregate transfer speed of up to 80 MB/sec. SSA connections are carried over thin, shielded, four-wire (two differential pairs) cables, that are less expensive and more flexible than the typical 50- and 68-conductor SCSI cables. Currently, IBM is the only major disk drive manufacturer shipping SSA drives; there has been little industry-wide support for SSA. That is not true of Fibre Channel, which has achieved wide industry support.

Fibre Channel ("F/C") is an industry-standard, high-speed serial data transfer interface used to connect systems and storage in point-to-point or switched topologies. FC-AL technology, developed with storage connectivity in mind, is a recent enhancement that also supports copper media and loops containing up to 126 devices, or nodes. Briefly, fibre channel is a switched protocol that allows concurrent communication among workstations, super computers and various peripherals. The total network bandwidth provided by fibre channel may be on the order of a terabit per second. Fibre channel is capable of transmitting frames along lines or lanes at rates exceeding 1 gigabit per second in at least two directions simultaneously. F/C technology also is able to transport commands and data according to existing protocols such as Internet protocol ("IP"), high performance parallel interface ("HIPPI"), intelligent peripheral interface ("IPI"), and, as indicated using SCSI, over and across both optical fiber and copper cable.

The fibre channel may be considered a channel-network hybrid. An F/C system contains sufficient network features to provide connectivity, distance and protocol multiplexing, and enough channel features to retain simplicity, repeatable performance and reliable delivery. Fibre channel allows for an active, intelligent interconnection scheme, known as a "fabric", and fibre channel switches to connect devices. The F/C fabric includes a plurality of fabric-ports (F_ports) that provide for interconnection and frame transfer between plurality of node-ports (N_ports) attached to associated devices that may include workstations, super computers and/or peripherals. A fabric has the capability of routing frames based on information contained within the frames. The N_port transmits and receives data to and from the fabric.

Transmission is isolated from the control protocol so that different topologies (e.g., point-to-point links, rings, multidrop buses, and crosspoint switches) can be implemented. Fibre Channel, a highly reliable, gigabit interconnect technology allows concurrent communications among workstations, mainframes, servers, data storage systems, and other peripherals. F/C technology provides interconnect systems for multiple topologies that can scale to a total system bandwidth on the order of a terabit per second. Fibre Channel delivers a new level of reliability and throughput. Switches, hubs, storage systems, storage devices, and adapters designed for the F/C environment are available now.

Following a lengthy review of existing equipment and standards, the Fibre Channel standards group realized that it would be useful for channels and networks to share the same fiber. (The terms "fiber' or "fibre" are used synonymously, and include both optical and copper cables.) The Fibre Channel protocol was developed and adopted, and continues to be developed, as the American National Standard for Information Systems ("ANSI"). See Fibre Channel Physical and Signaling Interface, Revision 4.2, American National Standard for Information Systems (ANSI) (1993) for a detailed discussion of the fibre channel standard, that is incorporated by reference into this document.

Current standards for F/C support bandwidth of 133 Mb/sec, 266 Mb/sec, 532 Mb/sec, 1.0625 Gb/sec, and 4 Gb/sec (proposed) at distances of up to ten kilometers. Fibre Channel's current maximum data rate is 100 MB/sec (200 MB/sec full-duplex) after accounting for overhead. In addition to strong channel characteristics, Fibre Channel provides powerful networking capabilities, allowing switches and hubs to interconnect systems and storage into tightly knit clusters. The clusters are capable of providing high levels of performance for file service, database management, or general purpose computing. Because Fibre Channel is able to span up to 10 kilometers between nodes, F/C allows very high-speed movement of data between systems that are greatly separated from one another. The F/C standard defines a layered protocol architecture consisting of five layers, the highest layer defining mappings from other communication protocols onto the F/C fabric.

The network behind the servers link one or more servers to one or more storage systems. Each storage system could be RAID ("Redundant Array of Inexpensive Disks"), tape backup, tape library, CD-ROM library, or JBOD ("Just a Bunch of Disks"). One type of RAID system divides each byte of data into bits and stores each bit on a different disk. If the data consists of 8-bit bytes, there will be 10 disks, one for each of the 8 bits, and two more for an error-correcting code. The error-correcting code makes it possible to reconstruct any single missing bit in any byte. Thus, if one of the disk drives fails completely, only one bit will be missing from each byte, and the contents of the failed disk can be reconstructed completely from the error-correcting code.

Fibre Channel networks have proven robust and resilient, and include at least these features: shared storage among systems; scalable networking; high performance; fast data access and backup. In a Fibre Channel network, legacy storage systems are interfaced using a Fibre Channel to SCSI bridge. Fibre Channel standards include network features that provide required connectivity, distance, and protocol multiplexing. It also supports traditional channel features for simplicity, repeatable performance, and guaranteed delivery.

The demand for speed and volume of transmission has generated a concomitant demand for a capability to sort data to enable a user to identify data and data streams that have higher priority than other data queued in devices for routing data such as a switch, particularly a fibre channel switch. It would be useful, therefore, to be able to order, or sequence, transmission of data through a fibre channel switch, including frames, based on the content of the frame as well as the source of the frame by assigning a score to data received by a device such as a switch, and to be able to transmit data and frames having the highest score.

Currently, therefore, a previously unaddressed need exists in the industry for a new, useful and reliable method for scoring queued frames for selective transmission through a switch, particularly in a Fibre Channel environment. It would be of considerable advantage to provide a method for assigning scores to data frames received by a switch, and to selectively expedite transmission of the frames having the highest score.

SUMMARY

In accordance with embodiments of the present invention a method for scoring queued frames for selective transmission through a routing device, including a switch, is provided. Embodiments of the invention provide for one or more fibre channel switches. Embodiments of the invention also include the receipt of data, including frames, by the one or more fibre channel switches at a connection, particularly a receiving port in the fibre channel switch. The switches, particularly fibre channel switches, are equipped with one or more registers. Further, the fibre channel switches include one or more means for programming the registers. The data may be received in any order, in sequence or not in sequence.

On receipt of the data, including one or more frames, the data is evaluated based on the content of the data, and an initial score is assigned to the content of the data, including one or more frames of data. The initial score is assigned to the data using a quality of service value based on the content of the data. At least one way to determine the initial value using a quality of service value based on content of the data is to locate at a specific location, on each of the frames, data that has been chosen for examination or scoring, information that is conveyed to the registers from the means for programming the registers associated with the switch. Means for programming the registers are included in all fibre channel switches, and may include a range of software programmability options. Also included in the means for programming are data templates that may be used to program the registers for specific purposes, and may be used for examining predetermined data, or data selected for high priority transmission through the switch. The data thus selected may be bit-wise ANDed with a data mask to obtain revised data. The revised data may be compared with the predetermined data to determine if a participation match exists. Alternatively, the adjusting step also permits selecting frames for which there is no participation match.

Embodiments of the present invention also include steps for adjusting the initial score. A variety of alternative score components may be applied to the initial score to determine one or more adjusted scores. For example, at least one embodiment of the present invention includes a step for identifying the connections, or receiving ports, in the switch where frames are received. A bandwidth allocation adjustment may be applied to the initial score, an adjustment derived from the data location among the receiving ports. In addition, embodiments provide for calculating the cumulative time that the data, including frames, remain on queue in transmit switches of the switch before being transmitted to a receiver device in the fibre channel fabric. Embodiments provide for measuring each millisecond (ms) of data time on queue, but different time intervals may be selected. Generally, the initial score is increased by the bandwidth allocation adjustment and for the time on queue.

Embodiments of the present invention also include a step by which the adjusted scores may be compared with each other. Frames having the highest adjusted scores are identified, and the data having the highest score is rearranged in a reordered queue based on the adjusted scores. The frames having the highest adjusted scores may then be transmitted through the switches.

The foregoing has outlined broadly the more important features of embodiments of the invention to better understand the detailed description that follows, and to better understand the contribution of the present invention to the art. Before explaining at least one embodiment of the invention in detail, it is to be understood that the invention is not limited in application to the details of construction, and to the arrangements of the components, provided in the following description or drawing figures. The invention is capable of other embodiments, and of being practiced and carried out in various ways. In addition, the phraseology and terminology, employed in this disclosure are for purpose of description, and should not be regarded as limiting.

At least one advantage of the present invention is that it enhances the availability of the delivery of data frames having higher priority than other frames.

Another advantage to the present invention is that it provides a method for scoring queued frames in a switch for selective transmission through the switch using programmable elements of fibre channel switches already known in the industry.

The present invention also will permit flexibility in selecting among alternative score components to assign scores to the frames received by a fibre channel switch.

Yet another advantage of the present invention is a method for selectively transmitting frames across a fibre channel fabric that is easy to use and to practice, and is cost effective.

These advantages, and other objects and features, of such a method for scoring queued frames for selective transmission through a routing device, including a switch, will become apparent to those skilled in the art when read in conjunction with the accompanying following description, drawing figures, and appended claims.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

BRIEF DESCRIPTION OF THE DRAWING

The novel features of this invention, and the invention itself, both as to structure and operation, are best understood from the accompanying drawing, considered in connection with the accompanying description of the drawing, in which similar reference characters refer to similar parts, and in which.

DESCRIPTION OF THE PREFERRED EMBODIMENTS

Briefly, the present invention provides a method for scoring queued frames for selective transmission through a switch, particularly a fibre channel switch. As used in this document, the term "scoring" describes the objective of the present invention, namely to assign a score to selected data, including data on a frame, and to select scores having the highest value for priority transmission across devices, including a switch, in a fibre channel fabric. The terms "queued" or "queue" refers to one or more data structures from which items are removed, but for application of the present invention, in the same order in which they were entered. A "frame," as used in this document, includes a presumed configuration of an aggregation of data bits as exemplified in FIG. 3.

Figure 1:
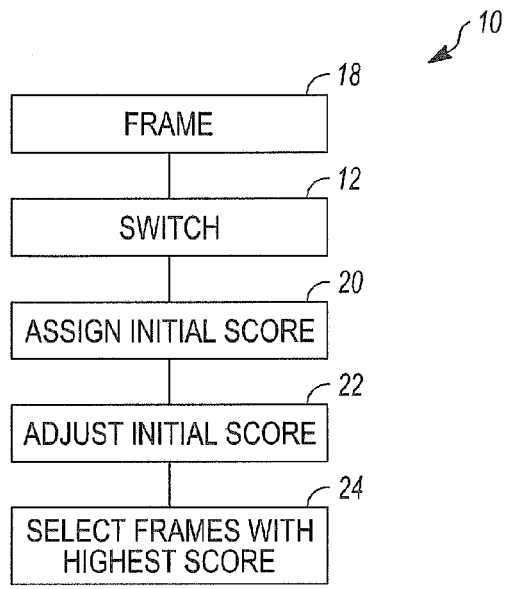
FIG. 1 is a schematic block diagram showing the steps in the method for scoring queued frames for selective transmission through a switch.
Figure 2:
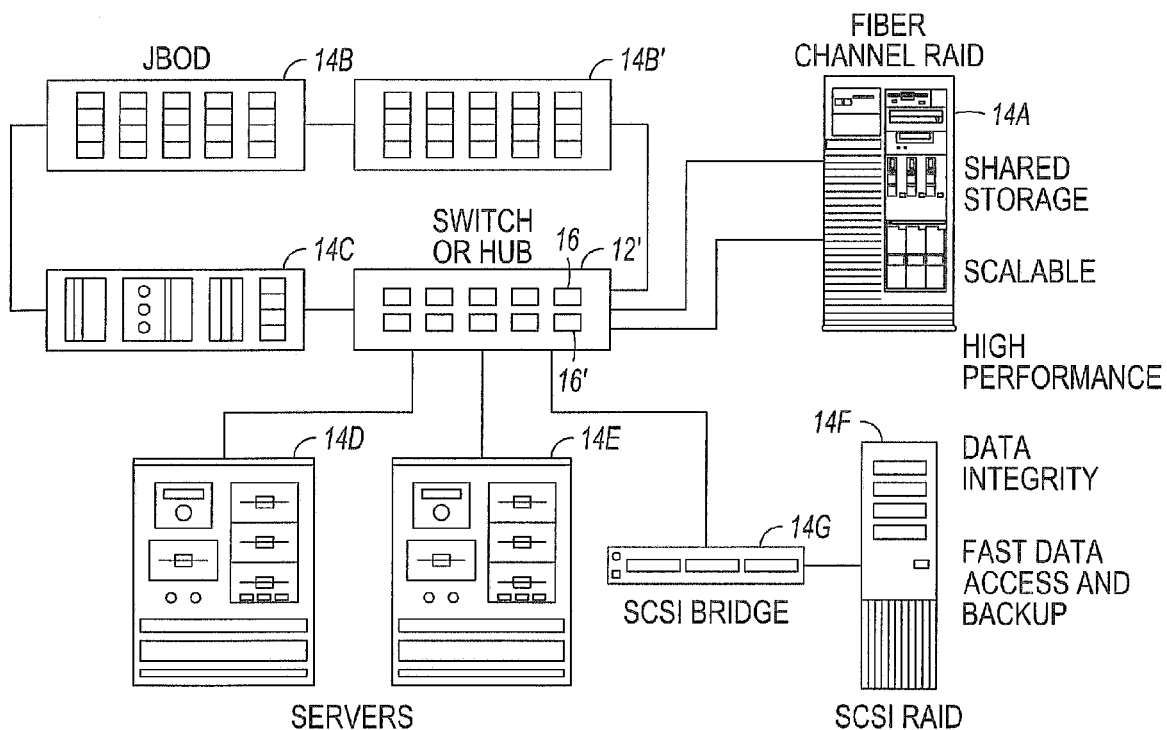
FIG. 2 is a perspective view showing one of many ways a number of devices, including a Fibre Channel switch, may be interconnected in a Fibre Channel network.
Figure 3:
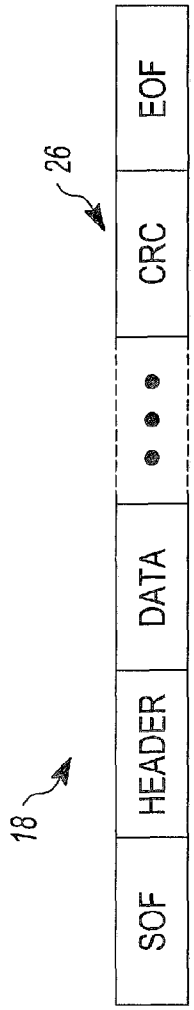
FIG. 3 is schematic representation of a variable-length frame communicated through a fiber optic switch as contemplated by the Fibre Channel industry standard.

As shown in FIG. 1, the invention generally includes providing one or more switches 12, particularly a fibre channel switch 12' in a fibre channel fabric generally shown in FIG. 2; receiving data, including frames 18, as exemplified in FIG. 3, at connections that include ports 16 in switches 12 as described in this document; assigning an initial score 20 to the content of the one or more frames 18; adjusting the initial score 22, as shown in FIG. 1, with one or more alternative score components to determine one or more adjusted scores; comparing the adjusted scores; selecting frames having the highest adjusted scores 24; and transmitting through fibre channel switches 12' frames 18 having the highest adjusted scores.

The present invention, therefore, is useful for enhancing delivery of data frames having higher priority than other frames. The present invention also is useful for scoring queued frames in a switch, particularly a fibre channel switch, for selective transmission through the switch using programmable elements of fibre channel switches already known in the industry. Flexibility in selecting among alternative score components also is included in the present invention.

Referring first to FIG. 1, a schematic and block diagram is shown illustrating in general the method for scoring queued frames for selective transmission through a switch, and is generally designated 10. As shown, the method for scoring queued frames for selective transmission through a switch 10 includes providing one or more fibre channel switches 12 as shown best in FIG. 2. At least one example of a switch 12 in which the present invention may successfully operate is a fibre channel switch employing distributed source and destination queuing for interconnecting a plurality of devices 14*a*-*f*, which may also include workstations, supercomputers, and other peripherals, through their associated node ports. Fibre channel switch 12' provides a fabric having a shared memory coupled to a plurality of fabric ports 16 through a bit-slicing memory controller (not shown) over which memory addresses, frame data and communications commands are transmitted. More particularly, at least one example of a fibre channel switch in which the present invention may successfully operate is described and shown in U.S. Pat. No. 5,894,481 issued on Apr. 13, 1999 to Book, a patent that is incorporated by reference into this document.

As shown by cross-reference between FIGS. 1, 2 and 3, the present invention also includes the receipt of data, including one or more frames 18, by one or more fibre channel switches 12' at a connection, particularly a receiving port 16' in fibre channel switch 12'. Fibre channel switch 12' is equipped with one or more registers (not shown). Although not shown in the accompanying drawing figures, the term "register" or "registers" as used in this document includes at least one or more row of electronic circuits that can switch back and forth between two states (0 and 1), will remain in either state until changed, and are used to store one or more groups of binary digits while a CPU is processing them. Further, as known by those skilled in the art, fibre channel switches 12' include one or more means for programming the registers.

Figure 4A:
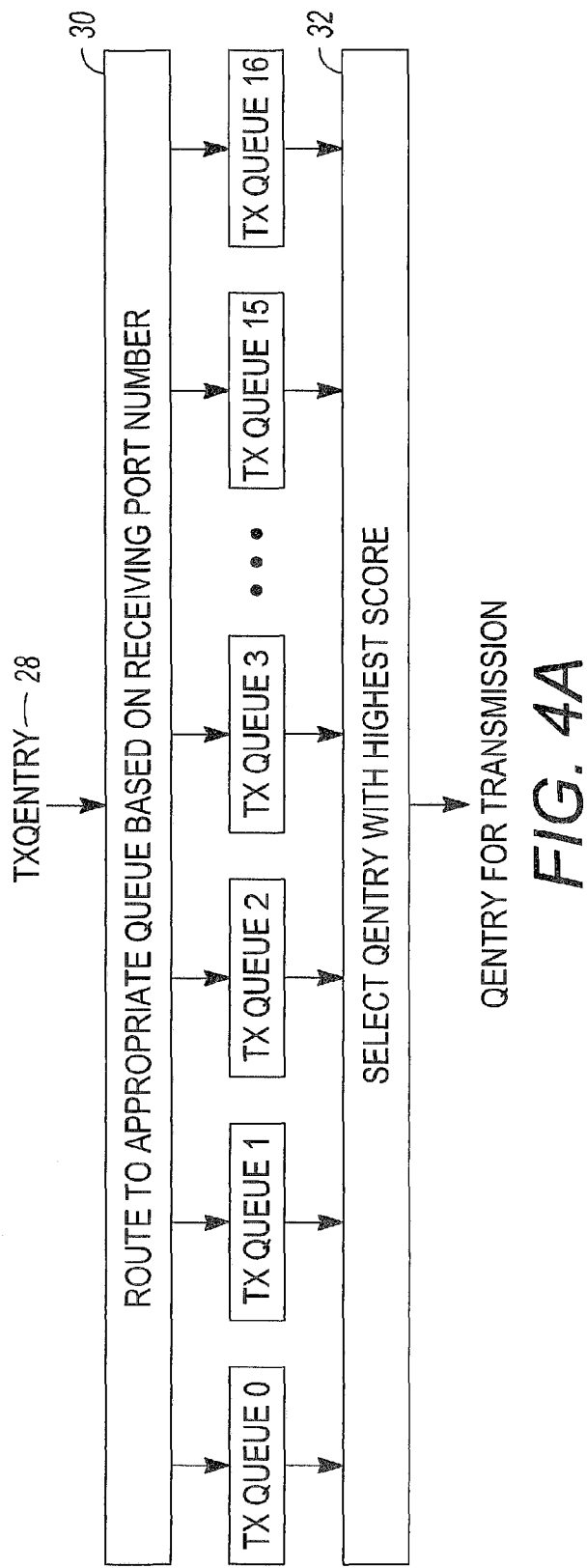
FIGS. 4A and 4B illustrate a schematic block flow diagram showing one way a quality of service value in accordance with the present invention may be accomplished.
Figure 4B:
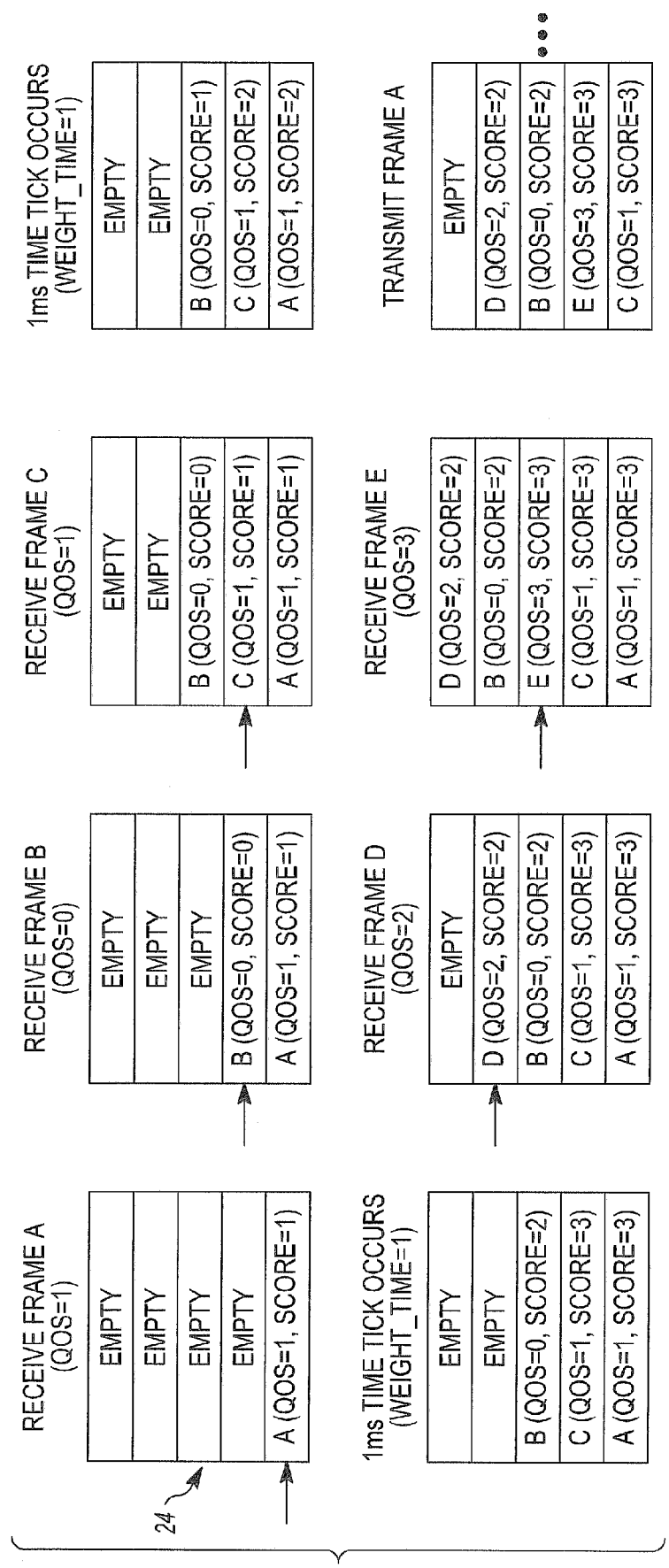

As shown in FIG. 3, frames 18 may be received in any order, in sequence or not in sequence. On receipt of the one or more frames, the data on the frames is evaluated based on the content of the data, and an initial score is assigned to the content of the one or more frames 18. More particularly, as shown in FIG. 4B, the initial score is assigned to data on frame 18 using a quality of service value 24 based on the content of the data. At least one way to determine the initial value using a quality of service value based on content is to locate, at a specific location on each frame 18, data 26, as exemplified in FIG. 3, that has been chosen for examination. Quality of service value 24 is communicated to the registers from the means for programming (not shown) included in the fibre channel switch 12'. The means for programming may include software. Included in the means for programming are data templates that may be used to program the registers and used for examining the predetermined data 26, or data 26 selected for high priority transmission through switch 12'. Data 26 thus selected may be bit-wise ANDed with a data mask to obtain revised data. The revised data may be compared with the predetermined data to determine if a participation match exists. Alternatively, the adjusting step also permits selecting frames 18 for which there is no participation match.

As shown best in FIG. 4B, which shows at least one of a number of ways the present invention may be practiced, each received frame 12 may be presumed to have a quality of service 24 ("QOS") level assigned to it by a receiving port. Each fibre channel switch 12' may provide for a number of separate queues 28, one for each of the receiving ports 30 (exemplified schematically in FIG. 4A) in a fibre channel switch 12'. Each queue 28 may contain one or more queue entries ("Qentries") 32. Qentries 32 also identify the buffer memory location of each frame 18. Each of the queues 28, as shown in FIG. 4A, may have a WEIGHT_TIME ("WT") register setting assigned. In addition, the WT register settings may be programmed to provide a greater portion of bandwidth to traffic received from receiving ports 30 with a greater value in the corresponding WT register setting. As used in this document, and as known to those skilled in the art, the term "bandwidth" refers to rate at which a fibre channel system, as exemplified in FIG. 2, may transmit data 26, which in turn is based on the range of frequencies that an electronic system can transmit. Each Qentry 32 may be given a bit score, for example an 8 bit score. As provided by the present invention, at least one formulation of the initial score to be assigned is based on the formula Score=QOS+[WT] [TOQ], where the term "TOQ" means time on queue that a Qentry 32 has spent on a queue 28.

Figure 5:
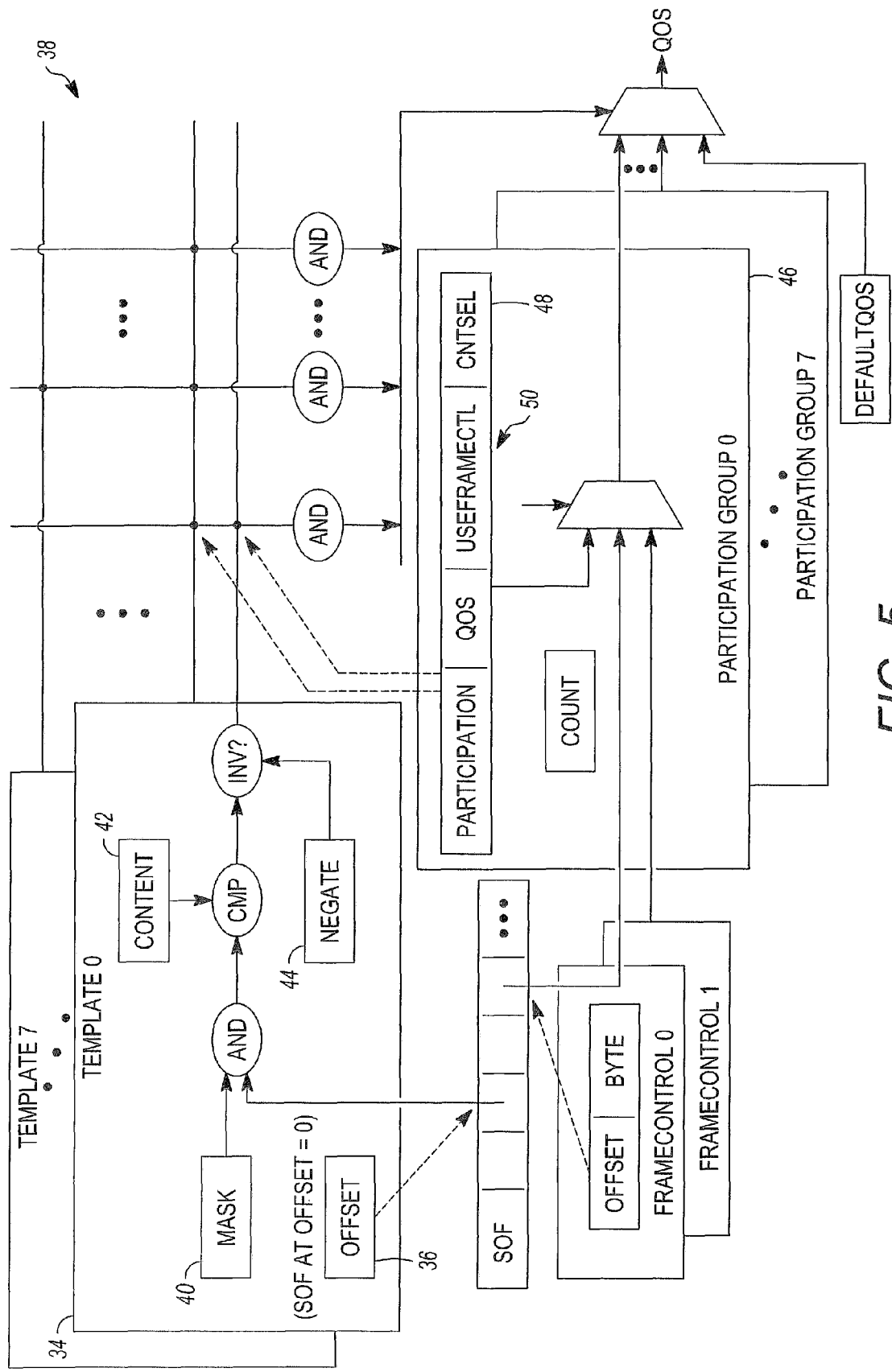
FIG. 5 is schematic block diagram showing one way the method of the present invention may assign a score.

As also shown in FIGS. 4A and 4B, at least one algorithm that may be used in connection with the practice of the present invention is:

A Qentry is received from Port_N;

An initial score for the Qentry is computed from the QOS level assigned by receiving port N, such that Score=QOS;

The Qentry is inserted into a Queue N ahead of all other Qentries in Queue N with lesser scores, but behind all other Qentries with greater or equal scores;

Following passage of a selected time period, the scores for every Qentry in Queue N is adjusted by the WT of N; and Prior to selection of a frame for transmission, the scores of the Qentries at the bottom of the Queues are compared with the entry with the greatest score for selected transmission through the switch, as best shown in FIG. 5.

As shown in FIG. 5, at least one example of the determination of the QOS component 24 of the score is shown. As shown, eight (8) templates 34 are programmed to scan data 26 within an incoming frame 18. Each template 34 examines data 26, which may include a word, at a specified location called an "Offset" 36 within incoming frame 18. The data 26 or word is bit-wise ANDed 38 with a mask word ("Mask") 40, and compared with a content word ("Content") 42. As set out in U.S. Pat. No. 6,233,236, incorporated herein by reference, in a particular example, content 42 includes information extracted from the header fields of each packet transmitted. For example, the header fields of each fibre channel frame include destination ID (i.e., a field identifying the port that is the intended recipient of a frame), a source ID (i.e., a field identifying the port to which the receiver belongs), a frame type (i.e., a field identifying the FC-4 frame type). It should be noted that the destination and source ID information referred to herein refers to intra-switch information and is different from the S_ID and D_ID information in an FC-4 frame that refer to actual fabric device addresses. Other types of information or "metadata" (i.e., data that describes the frame) may be included in the header or other designated fields of a frame depending on the frame format requirements of a particular application. If masked word 40 matches content word 42, a template match has occurred for that template 34. Alternatively, if there is no match, the "Negate" bit 44 is set true, which may be useful if a user seeks to search or scan or for no match, which would be useful, for example, when seeking to define a destination value on frame 18.

Also, a number of participation groups, for example eight (8) "Participation Groups" 46 may be programmed to assign a Quality of Service value 24 to each incoming frame 18. Each Participation Group 46 looks for a participation match for each template 34 corresponding to the bits set to >1=in the Participation field 48 (e.g., if Participation=0001011 then a participation match occurs if Templates 3, 1, and 0 all have template matches). When a participation match occurs, the Quality of Service level 24 for incoming frame 18 is either assigned the QOS value 24 associated with that participation group 48 (when UseFrameCtl=0, or to the frame control word from one of the Frame Control word finders when UseFrameCtl=1 or 2). In addition, while not an essential step in assigning an initial value based on QOS 24, at least two (2) frame control word finders 50 may be programmed to extract a 3-bit value from an incoming frame. Each frame control word finder may extract the 3 least significant bits from a byte in incoming frame 18, and Offset 36 and Byte fields may specify the location of the byte.

The present invention also includes one or more steps for adjusting the initial score. A variety of alternative score components may be applied to the initial score to determine one or more adjusted scores. For example, at least one embodiment of the present invention includes an alternative score component for identifying receiving ports (not shown) for frames 18, and applying a bandwidth allocation adjustment derived from the location of frame 18 among receiving ports 30. In addition, the present invention provides for calculating the cumulative time that data 26, including frame 18, remain on queue 28 in the transmit switches (not shown) of switch 12' before being transmitted to a receiver device in the fibre channel fabric as suggested by FIG. 2. The invention provides for measuring each millisecond (ms) of time data 26 is on queue 28, but different time intervals may be selected. Generally, the initial score is increased by the bandwidth allocation adjustment and for the time on queue.

The present invention also provides for comparing adjusted scores with each other. As best shown in FIG. 5, frames 18 having the highest adjusted scores are identified, rearranged in a reordered queue based on the adjusted scores, and frames 18 having the highest adjusted scores may then be transmitted through switches 12.

While the method for scoring queued frames for selective transmission through a switch as shown in drawing FIGS. 1 through 5 is one embodiment of the present invention, it is indeed but one embodiment of the invention, is not intended to be exclusive, and is not a limitation of the present invention. While the particular method for scoring queued frames for selective transmission through a switch as shown and disclosed in detail herein is fully capable of obtaining the objects and providing the advantages stated, this disclosure is merely illustrative of the presently preferred embodiments of the invention, and no limitations are intended in connection with the details of construction, design or composition other than as provided and described in the appended claims.

What is claimed is:

1. A system comprising:
   a queue configured to store queue entries associated with frames, each queue entry being inserted at a queue position based on an initial priority assigned to the queue entry, the queue being further configured to reorder at least one queue entry in the queue based on adjusted priorities assigned to one or more of the queue entries.

2. The system of claim 1 further comprising:
   a transmitter configured to transmit the frame having the highest priority before transmitting any other frame in the queue.

3. The system of claim 1, wherein the initial priority of each frame is adjusted based on adjustment values independent of content of the frame.

4. The system of claim 1, wherein the initial priority assigned to each frame is set to a quality of service associated with a participation group matched by the frame.

5. The system of claim 1, wherein the initial priority assigned to each frame is set to a quality of service associated with a source of the frame.

6. The system of claim 1 further comprising:
   a comparator configured to compare selected content of each frame to a template.

7. The system of claim 6, wherein the template is associated with a particular quality of service (QOS) level.

8. The system of claim 1, wherein the adjusted priorities are determined by adjusting priorities of the queue entries by applying a bandwidth allocation adjustment derived from locations of frames among receiving ports.

9. The system of claim 1, wherein the adjusted priorities are determined by adjusting priorities of the queue entries based on a time of the queue entry is in the queue.

10. The system of claim 1 further comprising:
    a timer configured to measure a cumulative time that at least one of the queue entries is in the queue.

11. A method comprising:
    storing in a queue a plurality of queue entries associated with frames, each queue entry being inserted at a queue position based on an initial priority assigned to the queue entry, wherein the queue is configured to reorder at least one queue entry in the queue based on adjusted priorities assigned to one or more of the queue entries.

12. The method of claim 11 further comprising:
    transmitting the frame having the highest priority before transmitting any other frame in the queue.

13. The method of claim 11, wherein the initial priority of each frame is adjusted based on adjustment values independent of content of the frame.

14. A method of claim 11, wherein the initial priority assigned to each frame is set to a quality of service associated with a participation group matched by the frame.

15. A method of claim 11, wherein the initial priority assigned to each frame is set to a quality of service associated a source of the frame.

16. A method of claim 11, further comprising:
    comparing selected content of each frame to a template.

17. A method of claim 11, wherein the adjusted priorities are determined by adjusting priorities of the queue entries by applying a bandwidth allocation adjustment derived from locations of frames among receiving ports.

18. A method of claim 11, wherein the adjusted priorities are determined by adjusting priorities of the queue entries based on a time of the queue entry is in the queue.

19. A method of claim 11 further comprising:
    measuring a time at least one of the queue entries is in the queue.

20. A network device comprising:
    a central processing unit;
    a memory attached to the central processing unit; and
    a means for programming the memory for storing in a queue a plurality of queue entries associated with frames, each queue entry being inserted at a queue position based on an initial priority assigned to the queue entry, wherein the queue is configured to reorder queue entries in the queue based on adjusted priorities assigned to one or more of the queue entries.

* * * * *